US005875339A

United States Patent [19]

Molnar et al.

[11] Patent Number: 5,875,339
[45] Date of Patent: Feb. 23, 1999

[54] ASYNCHRONOUS ARBITER USING MULTIPLE ARBITER ELEMENTS TO ENHANCE SPEED

[75] Inventors: Charles E. Molnar, Webster Groves, Mo.; Ian W. Jones, Palo Alto, Calif.

[73] Assignee: Sun Microsystems, Inc., Palo Alto, Calif.

[21] Appl. No.: 857,767

[22] Filed: May 15, 1997

Related U.S. Application Data

[63] Continuation of Ser. No. 333,198, Nov. 2, 1994, abandoned, which is a continuation-in-part of Ser. No. 303,247, Sep. 8, 1994, Pat. No. 5,713,025, which is a continuation-in-part of Ser. No. 140,654, Oct. 21, 1993, abandoned, which is a continuation-in-part of Ser. No. 140,655, Oct. 21, 1993, abandoned.

[51] Int. Cl.$^6$ ..................................................... G06F 13/00
[52] U.S. Cl. ........................... 395/728; 395/287; 395/856; 711/150
[58] Field of Search ........................ 395/800.07, 200.43, 395/835–839, 848, 856, 860, 287, 292, 293, 299, 311, 726, 727, 728; 327/19, 64, 82, 365; 340/825.5, 825.51; 711/100, 130, 147, 150, 151

[56] References Cited

U.S. PATENT DOCUMENTS

| 4,096,569 | 6/1978 | Barlow | 395/202 |
| 4,423,384 | 12/1983 | DeBock | 327/19 |

(List continued on next page.)

OTHER PUBLICATIONS

Slides presented at the Proceedings of the VII Banff Workshop:Asynchronous Hardware Design, Aug. 28–Sep. 23, 1993, 3 Pages, by Al Davis, Hewlett Packard, Palo Alto, California.

Article entitled "Synthesizing Asynchronous Circuits:Practice & Experience", (from the book from the VII Banff Workshop: Asynchronous Hardware Design, held in 1993), by Al Davis, Department of Computer Science, University of Utah, 3 Pages, 1995.

"Introduction to VLSI Systems", Carver Mead et al., Oct. 1980, pp. 260–261.

Engineering notebook pages, dated Oct. 11 & 12, 1988, prepared by Mr. Ken Stevens while employed by H–P, in Palo Alto, CA. (Note, no citation is provided because to Applicants' knowledge, these pages were never published.).

"SBC: A Multiport Memory Building Block for Asynchronous Systems", by A.L. Davis & Ken Stevens, Schlumberger P.A. Research Center, Palo Alto, CA, Nov. 12, 1987. (Note, no citation is provided because to the Applicants' knowledge, this paper was never published.).

"2 Input Sequence Example", by Alex Yakovlev, Apr. 30, 1994. This reference was obtained from an asynchronous systems interest group email circulation. It is believed that additional copies may be obtained by contacting Mr. Yakovlev at email ID alex.yakovlev@newcastle.ac.uk.

"Introduction to VLSI Systems", Carver Mead and Lynn Conway, Addison–Wesley, 1980, pp. 260–261.

*Primary Examiner*—Alpesh M. Shah
*Attorney, Agent, or Firm*—James W. Rose; Sun Microsystems, Inc.

[57] ABSTRACT

An arbiter circuit having a plurality of mutual exclusion (MUTEX) elements is disclosed. Each of the MUTEX elements is coupled to receive a different combination of request signals and their complements and grant signals and their complements fed back from the output of the arbiter circuit. At any point in time, only one of the plurality of MUTEX elements is selected based on the current state of the grant signals. The selected MUTEX element is used to arbitrate and grant one user exclusive access to a shared resource among the one or more users requesting exclusive access to the shared resource. All the other MUTEX elements in the arbiter circuit are disabled and are inactive during this time. After issuing the grant signal, the selected MUTEX element is disabled and a new MUTEX element responsible for issuing the next grant signal is selected based the new state of the grant signals.

20 Claims, 4 Drawing Sheets

U.S. PATENT DOCUMENTS

| | | | |
|---|---|---|---|
| 4,473,880 | 9/1984 | Budde et al. | 395/292 |
| 4,604,694 | 8/1986 | Hough | 395/650 |
| 4,641,266 | 2/1987 | Walsh | 395/291 |
| 4,698,753 | 10/1987 | Hubbins et al. | 395/200.05 |
| 4,774,660 | 9/1988 | Conforti | 395/729 |
| 4,835,672 | 5/1989 | Zenk et al. | 395/478 |
| 4,872,004 | 10/1989 | Bahnick et al. | 340/825.5 |
| 4,894,565 | 1/1990 | Marquardt | 327/19 |
| 4,924,380 | 5/1990 | McKinney et al. | 395/291 |
| 4,956,820 | 9/1990 | Hashimoto | 365/222 |
| 4,962,379 | 10/1990 | Yasuda et al. | 340/825.51 |
| 4,969,120 | 11/1990 | Azevedo et al. | 395/297 |
| 5,038,274 | 8/1991 | Nielsen | 395/301 |
| 5,038,276 | 8/1991 | Bozzetti et al. | 395/293 |
| 5,151,994 | 9/1992 | Wille et al. | 395/800 |
| 5,167,022 | 11/1992 | Bahr et al. | 395/288 |
| 5,193,197 | 3/1993 | Thacker | 395/303 |
| 5,214,775 | 5/1993 | Yabushita et al. | 395/444 |
| 5,263,146 | 11/1993 | Mishima | 395/490 |
| 5,265,212 | 11/1993 | Bruce, II | 395/293 |
| 5,313,641 | 5/1994 | Simcoe et al. | 395/730 |
| 5,339,443 | 8/1994 | Lockwood | 395/732 |
| 5,341,052 | 8/1994 | Dike et al. | 327/19 |
| 5,404,540 | 4/1995 | Dike | 395/732 |
| 5,408,629 | 4/1995 | Tsuchiya et al. | 395/478 |
| 5,442,758 | 8/1995 | Slingwine et al. | 395/375 |
| 5,454,111 | 9/1995 | Frame et al. | 395/288 |

5,875,339

ASYNCHRONOUS ARBITER USING MULTIPLE ARBITER ELEMENTS TO ENHANCE SPEED

CROSS-REFERENCE TO RELATED APPLICATION

This is a continuation of divisional application Ser. No. 08/333,198,filed Nov. 2, 1994, now abandoned which is a continuation-in-part of U.S. patent application Ser. No. 08/303,247 "Asynchronous Arbiter using multiple Arbiter elements to enhance speed", filed Sept. 8, 1994, now U.S. Pat. No. 5,713,025, which is a continuation-in-part of U.S. patent application Ser. No. 08/140,654 entitled "Counterflow Pipeline", now abandoned, and U.S. patent application Ser. No. 08/140,655 entitled "Counterflow Pipeline Processor", both filed Oct. 21, 1993, now abandoned. The three above-identified patent applications are incorporated by reference herein.

BACKGROUND OF THE INVENTION

1. Field of the Invention

The present invention relates to an arbiter, and more particularly, to an arbiter having a plurality of arbiter elements where the arbiter element selected to perform the next arbitration is determined by the state of the grant signals of the arbiter after the current arbitration.

2. Description of the Related Art

MUTEX elements, sometimes referred to as sequencer circuits or interlock elements, are known in the prior art. For example, a MUTEX circuit is disclosed in the textbook entitled "Introduction to VLSI Systems", by Carver Mead and Lynn Conway, Addison-Wesley Publishing Company, Reading Massachusetts, *1980*, page 261. This publication, however, fails to teach the concept of enabling and disabling a MUTEX element in an arbiter circuit.

SUMMARY OF THE INVENTION

The present invention relates to an arbiter circuit having a plurality of mutual exclusion (MUTEX) elements. Each of the MUTEX elements is coupled to receive a different combination of request signals and their complements and grant signals and their complements fed back from the output of the arbiter circuit. At any point in time, only one of the plurality of MUTEX elements is selected based on the current state of the grant signals. The selected MUTEX element is used to arbitrate and grant one user exclusive access to a shared resource among the one or more users requesting exclusive access to the shared resource. All the other MUTEX elements in the arbiter circuit are disabled and are inactive during this time. After issuing the grant signal, the selected MUTEX element is disabled and a new MUTEX element responsible for issuing the next grant signal is selected based the new state of the grant signals.

In one embodiment, the current state of the grant signals is used to connect the request signals to the selected MUTEX element, thereby enabling the MUTEX element. The request signals applied to the other MUTEX elements are disconnected, thereby disabling these other MUTEX elements. In a second embodiment, the request signals are applied directly to the plurality of MUTEX elements and an enable signal is used to enable one of the plurality of MUTEX elements, where the enable signal is derived from the current state of the grant signals. With either embodiment, only one of the plurality of MUTEX elements is activated at a time.

The arbiter circuits of the present invention provide a number of advantages. Only one MUTEX element among the plurality of MUTEX elements is enabled at a time. This feature reduces power consumption and spurious switching in the circuit. Further, simplified MUTEX element and related circuitry reduces the number of gate delays along the input/output path of the arbiter circuit, thereby increasing the speed of the circuit.

DESCRIPTION OF THE DRAWINGS

The objects, features and advantages of the system of the present invention will be apparent from the following description in which.

DESCRIPTION OF THE PREFERRED EMBODIMENT

Figure 1:
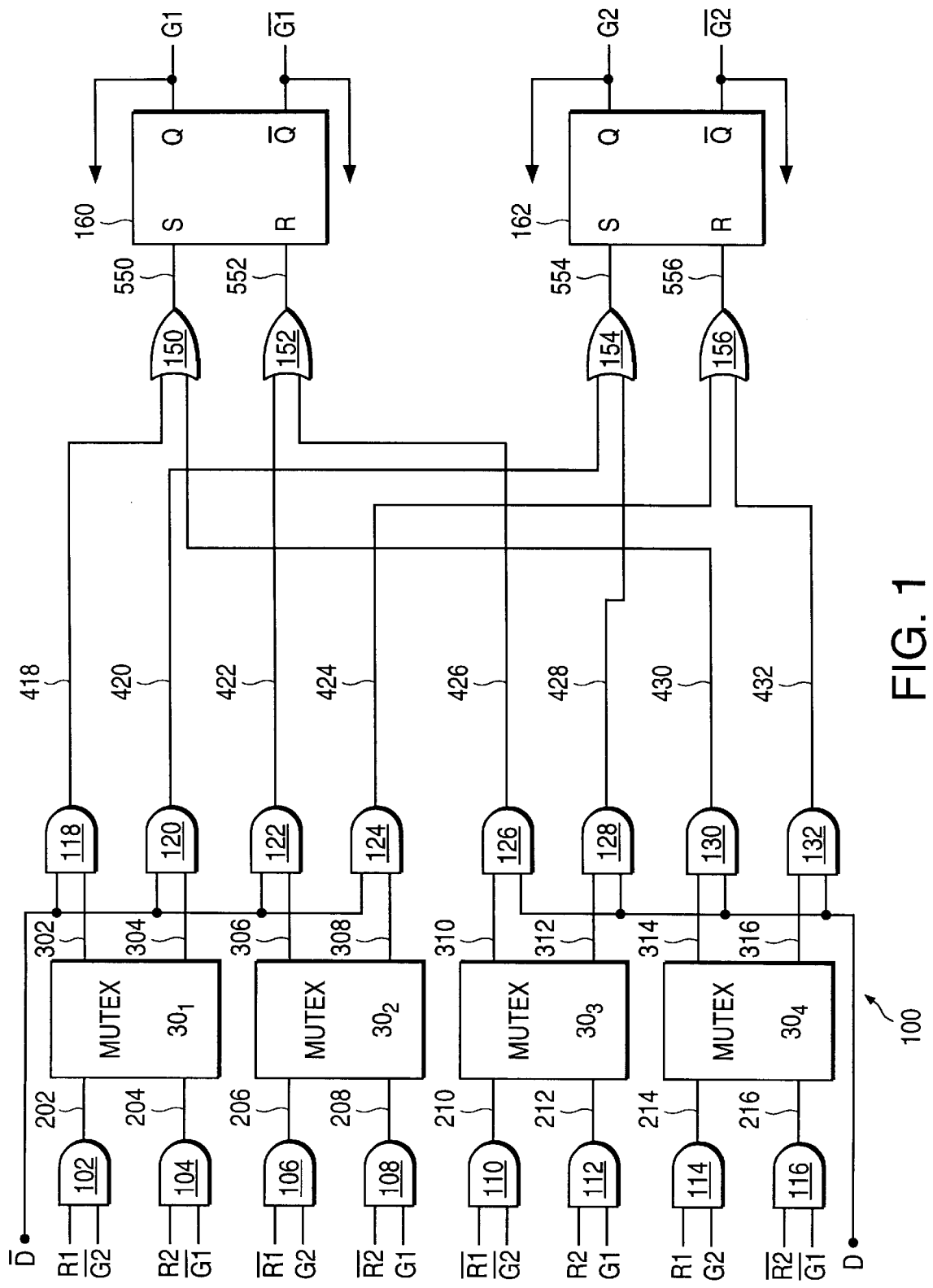
FIG. 1 illustrates an arbiter circuit previously described in the above-identified parent patent application entitled Asynchronous Arbiter Using Multiple Arbiter Elements to Enhance Speed.

For the sake of completeness and to help describe the present invention, the Applicants have included FIG. 1 in the present application. FIG. 1 is identical to FIG. 3 of the above-identified co-pending parent application, Ser. No. 08/303,247, entitled "Asynchronous using multiple arbiter elements to enhance"

Referring to FIG. 1, an arbiter circuit is shown. The arbiter circuit 100 includes AND gates 102 through 132, a plurality of MUTEX elements $30_1$ through 304, OR gates 150 through 156, and SR flip flops 160 and 162. The arbiter circuit 100 is intended to be used in the arbiter block of arbiter system 10 illustrated in FIG. 1 of the above-identified parent application, Ser. No. 08/303,247, not provided herein. As such, reference is made to a first user (not shown) which generates a request signal R1 when seeking exclusive access to a shared resource (not shown), and a second user (not shown) that generates a request signal R2 when seeking access to the shared resource. The shared resource generates a done signal D when it is finished serving a selected user.

The AND gates 102 through 116 are each coupled to receive a unique combination of two input signals selected from the group of request signal R1, request signal R2, grant signal G1, grant signal G2, and their complements $\overline{R1}$, $\overline{R2}$, $\overline{G1}$ and $\overline{G2}$ respectively. The specific two input signals, along with the reference number designating the output signal for the AND gates 102 through 116 are respectively set forth in Table I below.

TABLE I

| GATE | Inputs | Output |
| --- | --- | --- |
| 102 | R1, $\overline{G2}$ | 202 |
| 104 | R2, $\overline{G1}$ | 204 |
| 106 | $\overline{R1}$, G2 | 206 |
| 108 | $\overline{R2}$, G1 | 208 |
| 110 | $\overline{R1}$, $\overline{G2}$ | 210 |
| 112 | R2, G1 | 212 |
| 114 | R1, $\overline{G2}$ | 214 |
| 116 | $\overline{R2}$, $\overline{G1}$ | 216 |

The MUTEX elements $30_1$ through $30_4$, each receive two of the signals 202 through 216 from AND gates 102 through 116 and generates two output signals 302 through 316 respectively. Table II below specifies the two input signals received and the two output signals generated by each MUTEX element $30_1$ through $30_4$ respectively.

TABLE II

| MUTEX Element | Inputs | Outputs |
|---|---|---|
| $30_1$ | 202, 204 | 302, 304 |
| $30_2$ | 206, 208 | 306, 308 |
| $30_3$ | 210, 212 | 310, 312 |
| $30_4$ | 214, 216 | 314, 316 |

The AND gates 118 through 132 are each coupled to receive one of the output signals 302 through 316 from the MUTEX elements $30_1$ through 304 and either the done signal D or the complement of the done signal $\overline{D}$. Table III below provides the specific input signals provided to AND gates 118 through 132 and the output signal generated by AND gates 118 through 132 respectively.

TABLE III

| GATE | Input Signals | Output Signals |
|---|---|---|
| 118 | 302, $\overline{D}$ | 418 |
| 120 | 304, $\overline{D}$ | 420 |
| 122 | 306, $\overline{D}$ | 422 |
| 124 | 308, $\overline{D}$ | 424 |
| 126 | 310, D | 426 |
| 128 | 312, D | 428 |
| 130 | 314, D | 430 |
| 132 | 316, D | 432 |

The OR gates 150 through 156 are coupled to each receive two of the output signals 418 through 432 respectively. Table IV below provides the specific input signals to OR gates 150 through 156 and the output signals 550 through 556 generated by OR gates 150 through 156 respectively.

TABLE IV

| GATE | Input Signals | Output Signal |
|---|---|---|
| 150 | 418, 430 | 550 |
| 152 | 422, 426 | 552 |
| 154 | 420, 428 | 554 |
| 156 | 424, 432 | 556 |

The first flip flop 160 is coupled to receive signal 550 at its set (S) input and signal 552 at its reset (R) input and to generate grant signal G1 and complementary signal $\overline{G1}$ in response thereto. The second flip flop 162 is coupled to receive signal 554 at its set (S) input and signal 556 at its (R) input and to generate grant signal G2 and complementary signal $\overline{G2}$ in response thereto. As previously noted, grant signals G1 and G2 and complementary signals $\overline{G1}$ and $\overline{G2}$ are fed back to the inputs of AND gates 102 through 116, as noted in Table I above.

OPERATION

A. Initial State

Operation of the arbiter circuit 100 is best described starting from the initial state. Request signal R1 from the first user and request signal R2 from the second user are both at logic low levels (i.e., R1=0 and R2=0) in the initial state. Similarly, grant signal G1, grant signal G2 and done signal D are all at logic low levels (i.e., G1=0, G2=0 and D=0). Under these conditions, the output signals 550 through 556 of OR gates 150 through 156 are all low. As a result G1 and G2 remain low and $\overline{G1}$ and $\overline{G2}$ are high. The logic levels at the inputs and outputs of AND gates 102 through 116, MUTEX elements 301, through 304, and AND gates 118 through 132 are provided in

TABLE V

| Input Signals | AND Gate | Signal | MUTEX | Signal | Done Signal | AND Gate | Signal |
|---|---|---|---|---|---|---|---|
| R1 = 0, $\overline{G2}$ = 1 | 102 | 202 = 0 | $30_1$ | 302 = 0 | $\overline{D}$ = 1 | 118 | 418 = 0 |
| R2 = 0, $\overline{G1}$ = 1 | 104 | 204 = 0 | $30_1$ | 304 = 0 | $\overline{D}$ = 1 | 120 | 420 = 0 |
| $\overline{R1}$ = 1, G2 = 0 | 106 | 206 = 0 | $30_2$ | 306 = 0 | $\overline{D}$ = 1 | 122 | 422 = 0 |
| $\overline{R2}$ = 1, G1 = 0 | 108 | 208 = 0 | $30_2$ | 308 = 0 | $\overline{D}$ = 1 | 124 | 424 = 0 |
| $\overline{R1}$ = 1, $\overline{G2}$ = 1 | 110 | 210 = 1 | $30_3$ | 310 = 1 | D = 0 | 126 | 426 = 0 |
| R2 = 0, $\overline{G1}$ = 0 | 112 | 212 = 0 | $30_3$ | 312 = 0 | D = 0 | 128 | 428 = 0 |
| R1 = 0, G2 = 0 | 114 | 214 = 0 | $30_4$ | 314 = 0 | D = 0 | 130 | 430 = 0 |
| $\overline{R2}$ = 1, $\overline{G1}$ = 1 | 116 | 216 = 1 | $30_4$ | 316 = 1 | D = 0 | 132 | 432 = 0 |

It is useful to note that in the initial state, the two inputs into AND gate 110 are both high ($\overline{R1}$=1, $\overline{G2}$=1). Consequently, the output 210 of AND gate 110 and the output 310 of MUTEX 303 are also both high. Since the done signal D is initially low, the output of AND gate 126 is low. Consequently, the output 552 of OR gate 152 is low because both of its inputs 422 and 426 are low. This same condition is present for AND gate 116, MUTEX $30_4$, AND gate 132 and OR gate 156.

B. Arbitration State

Three examples below have been selected to illustrate the operation of the arbiter circuit 100 after being initialized as described over. In the examples, the first user 14 makes a first request followed by a subsequent request from (a) the first user 14; (b) the second user 16; (c) both the first user 14 and the second user 16.

When the first user 14 requests access to the shared resource 18, the request signal R1 transitions high. As a result, the output 202 of AND gate 102, the output 302 of MUTEX element $30_1$, the output 418 of AND gate 118, the output 550 of OR gate 150, and grant signal G1 of the first flip flop 160 all successively transition high, granting the first user 14 exclusive use of the shared resource 18.

It is useful to note that during any grant period, the signals G1, $\overline{G1}$, G2 and $\overline{G2}$ are fed back to the various inputs of AND gates 102 through 116. The current state of signals G1, $\overline{G1}$, G2 and $\overline{G2}$ are used to select one of the four MUTEX element $30_1$ through 304. The selected MUTEX is then designated to arbitrate the next request signal or signals. With G1=1 and G2=0, MUTEX element $30_3$ arbitrates the next request, regardless of whether the first user 14, the second user 16, or both, generates the next request or requests. Each of these possibilities is discussed below.

a. If the first user 14 generates the next request, the request signal R1 transitions from high to low. The inputs (i.e., $\overline{R1}$ and $\overline{G2}$) of AND gate 110 are consequently both high, causing the output signal 210 of AND gate 110, and the output 310 of the MUTEX element $30_3$ to transition high.

When the done signal D transitions high, indicating the availability of the shared resource 18, both inputs to AND gate 126 are high. As a result, the output 426 of AND gate 126, the output 552 of OR gate 152, and grant signal $\overline{G1}$ of flip flop 160 all successively transition high, and G1 transitions low, again providing the first user 14 exclusive access to the shared resource. It is useful to note that the new state of grant signals (G1=0, $\overline{G1}$=1, G2 =0, $\overline{G2}$=1) designates the first MUTEX element $30_1$ to handle the next request from the first user 14, the second user 16, or both.

b. If the second user 16 generates the next request, the request signal R2 transitions from low to high. The inputs (i.e., R2 and G1) of AND gate 112 are therefore both high, causing the output 212 of AND gate 112 and output 312 of MUTEX element $30_3$ to transition high. As a result, when the done signal D transitions high, indicating the availability of the shared resource 18, the output 428 of AND gate 128, the output 554 of OR gate 154 and grant signal G2 of flip flop 162 all successively transition high, providing the second user 16 exclusive access to the shared resource 18. It is useful to again note that with the new state of grant signals (G1 =1, $\overline{G1}$=0, G2=1, $\overline{G2}$=0), the second MUTEX 302 is designated to handle the next request from the first user 14, the second user 16, or both.

c. If the first user 14 and the second user 16 generate a transition on request signal R1 and a transition on request signal R2 at approximately the same time, then both output signals 210 and 212 of AND gates 110 and 112 transition high, possibly causing the MUTEX element 303 to enter a metastable state. Eventually, one of the MUTEX outputs 310 or 312 is selected and transitions high, causing either G1 or G2 to transition as described in the two examples above. The non-selected request remains ungranted until selected in a subsequent arbitration process.

The done signal $\overline{D}$ and D as applied to the inputs of AND gates 118 through 132 guarantees that flip flops 160 and 162 do not transition during the time the shared resource 18 is being accessed by the current user. If the done signal D has already occurred prior to the next request signal or signals, then the arbiter circuit 100 generates a grant signal immediately after the designated MUTEX has selected the next user.

The arbiter 100 provides a number of unique features not found in the prior art. Each one of the four MUTEX elements $30_1$ through $30_4$ defines an "arbiter element". At any point in time, only one of the four arbiter elements is used to arbitrate and issue a grant signal for the then current request or request signals received by the arbiter 100. The output state of the arbiter 100, after issuing the previous grant, is used to designate the current arbiter element. Similarly, the output state of the arbiter 100, after arbitrating the current request signal or signals, is used to designate the next arbiter element.

The arbitration process for the current request signal or signals starts as soon as the grant signal from the previous arbitration is generated. When the current request signal or signals is received at the arbiter 100, the current MUTEX processes and arbitrates the signals immediately. As a result, there is only a minor delay of a few logic gates between the current request signal and the corresponding grant signal after the done signal is received, unless nearly simultaneous requests cause the current MUTEX to respond with a delay prolonged by metastability.

NEW INFORMATION

With the arbiter circuit 100, three conditions must be present before the arbiter circuit 100 is capable of generating the next grant signal. First, the grant signals G1 and G2 from the current grant must be fed back to the inputs of the MUTEX elements $30_1$ through $30_4$. Second, at least one new request signal, either R1, R2, or both, must be received at the MUTEX elements $30_1$ through $30_4$. Third, the done signal D, which signifies that the shared resource is done serving the current user, must be received. Only when the above three conditions are satisfied, can the arbiter circuit 100 generate the next grant signal.

With the arbiter circuit 100, it is possible for two of the MUTEX elements $30_1$ through $30_4$ to be active at the same time. For example, when the MUTEX element $30_1$ is activated under the above defined conditions, one of the other MUTEX elements $30_2$ through $30_4$ is also active. If request signal R2 remains static (R2=0), the MUTEX element $30_2$ becomes active because both inputs into AND gate 108 are high ($\overline{R2}$=1 and G1=1). As a result, the output 308 of MUTEX 302, the output 424 of AND gate 124, and the output 556 of OR gate 156 are all high. As a result, the $\overline{G2}$ output of flip flop 162 is maintained high. On the other hand, if request signal R2 transitions high, then the MUTEX element $30_3$ is activated because both inputs into AND gate 112 are high (R2=1, G1=1). The output 312 of MUTEX element $30_3$ transitions high as a result. When the done signal D is received, the output signal 428 of AND gate 128 and the output 554 of OR gate 154 transitions high, causing the output G2 of flip flop 162 to transition high, thereby granting the second user exclusive access to the shared resource.

THE PRESENT INVENTION

Figure 2:
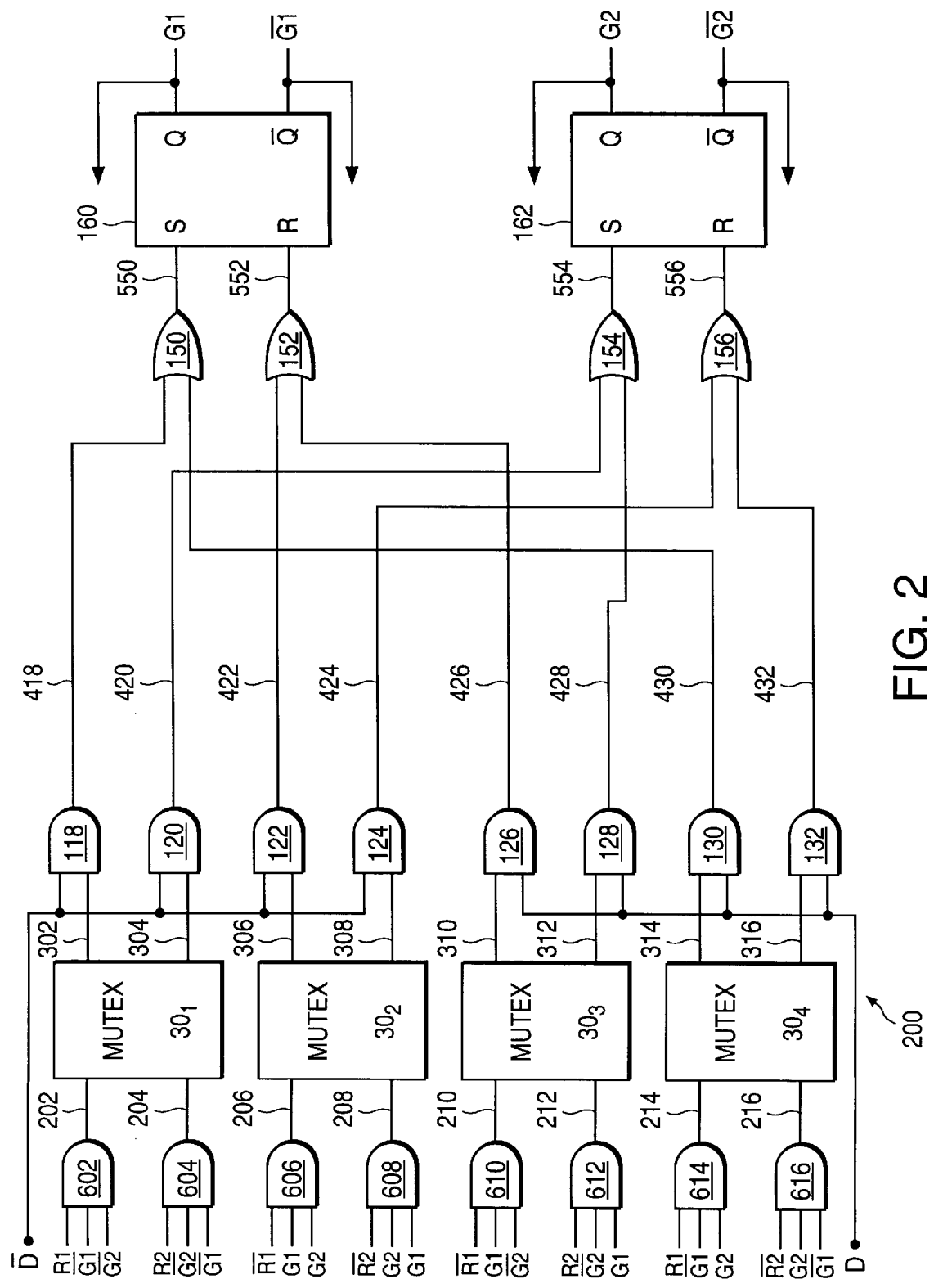
FIG. 2 illustrates a modification of the arbiter circuit of FIG. 1 of the present invention.

Referring to FIG. 2, a modified arbiter circuit according to the present invention is shown. The arbiter circuit 200 includes many of the same elements which perform the same functions as provided in the arbiter circuit 100 of FIG. 1. Like elements that perform the same or similar functions in FIG. 1 are designated by the same reference numerals in FIG. 2, and therefore are not describe in detail herein. One difference between the two arbiters is that the two-input AND gates 102 through 116 of arbiter circuit 100 have been replaced by three-input AND gates 602 through 616 of arbiter 200. Reference designators identifying the three input signals and the output signal for AND gates 602 through 616 are respectively set forth in Table VI below.

TABLE VI

| GATE | REQUEST INPUT SIGNAL | GRANT INPUT SIGNALS | OUTPUT SIGNAL | MUTEX ELEMENT |
| --- | --- | --- | --- | --- |
| 602 | R1 | $\overline{G1}$, $\overline{G2}$ | 202 | $30_1$ |
| 604 | R2 | $\overline{G1}$, G2 | 204 | $30_1$ |
| 606 | R1 | G1, G2 | 206 | $30_2$ |
| 608 | $\overline{R2}$ | G1, G2 | 208 | $30_2$ |
| 610 | $\overline{R1}$ | G1, $\overline{G2}$ | 210 | $30_3$ |
| 612 | R2 | $\overline{G1}$, G2 | 212 | $30_3$ |
| 614 | R1 | $\overline{G1}$, G2 | 214 | $30_4$ |
| 616 | R2 | G1, G2 | 216 | $30_4$ |

A review of FIG. 2 and of Table IV indicates that each AND gate 602 through 616 has three inputs: coupled to either request signal R1, $\overline{R1}$, R2, or $\overline{R2}$; a second input coupled to either grant signal G1 or $\overline{G1}$; and a third input coupled to either grant signal G2 or $\overline{G2}$. The two grant signals applied to pair of AND gates (i.e., 602 and 604, 606 and 608, 610 and 612, and 614 and 616) are identical. The first AND gate of each pair is couple to receive either R1 or $\overline{R1}$ and the second AND gate of each pair is couple to receive either R2 or $\overline{R2}$. Accordingly, for each of the four possible combination of values G1 and G2, only one of the pairs of AND gates has both its grant signal inputs at logic high levels. Any request signals, either R1, R2, or both, are applied through this AND gate pair are "connected" to the corresponding MUTEX element, thus enabling the MUTEX element. A requesting user is therefore granted access to the shared resource through the operation of the enabled MUTEX element, producing a change in either grant signal G1 or grant signal G2. This change, when fed back to the AND gates 602 through 616, disables the enabled MUTEX element, and enables one of the three other MUTEX elements in a similar manner. Thus, with the arbiter circuit 200, only one of the MUTEX elements $30_1$ through $30_4$ is active at a time. The other three MUTEX elements are inactive or disabled.

Consider the same example provided above, where grant signal G1 is low and grant signal G2 is low (G1=0, $\overline{G1}$=1,G2=0 and $\overline{G2}$=1) and where the request signal R1 is high and request signal R2 is low (R1=1 and R2=0). Under these conditions, only the output 202 of AND gate 602 is high. The outputs 204 through 216 of AND gates 604 through 616 are all low. The output 302 of MUTEX $30_1$, the output 418 of AND gate 118, and the output 550 of OR gate 150 are therefore all driven high. As a result, the flip flop 160 drives signal G1 high, providing the first user exclusive access to the shared resource. When grant signal G1 transitions high, the output 202 of AND gate 602 transition low. The output 204 of AND gate 604 is also low when grant signal G1 is high. The MUTEX element $30_1$ is therefore deactivated. The grant signal G1, however, is maintained high by the flip flop 160.

Based on the current state of the grant signal G1 and G2, MUTEX element $30_3$ is designated to handle the next request signal or signals from the first user, the second user, or both. Since both G1 and $\overline{G2}$ are high (G1=1, $\overline{G2}$=1), two of the three inputs to AND gates 610 and 612 are high. Accordingly, as soon as a new request arrives, the MUTEX element $30_3$ can arbitrate the request. If R1 transitions low (R1=0), causing $\overline{R1}$ to transition high ($\overline{R1}$=1), then the MUTEX element $30_3$ is activated and output 310 transitions high, causing the flip flop 160 to drive grant signal $\overline{G1}$ high. Alternatively, if R2 transitions high (R2=1), then the MUTEX element $30_3$ is activated and output 312 transitions high, causing the flip flop 162 to drive grant signal G2 high.

Figure 3:
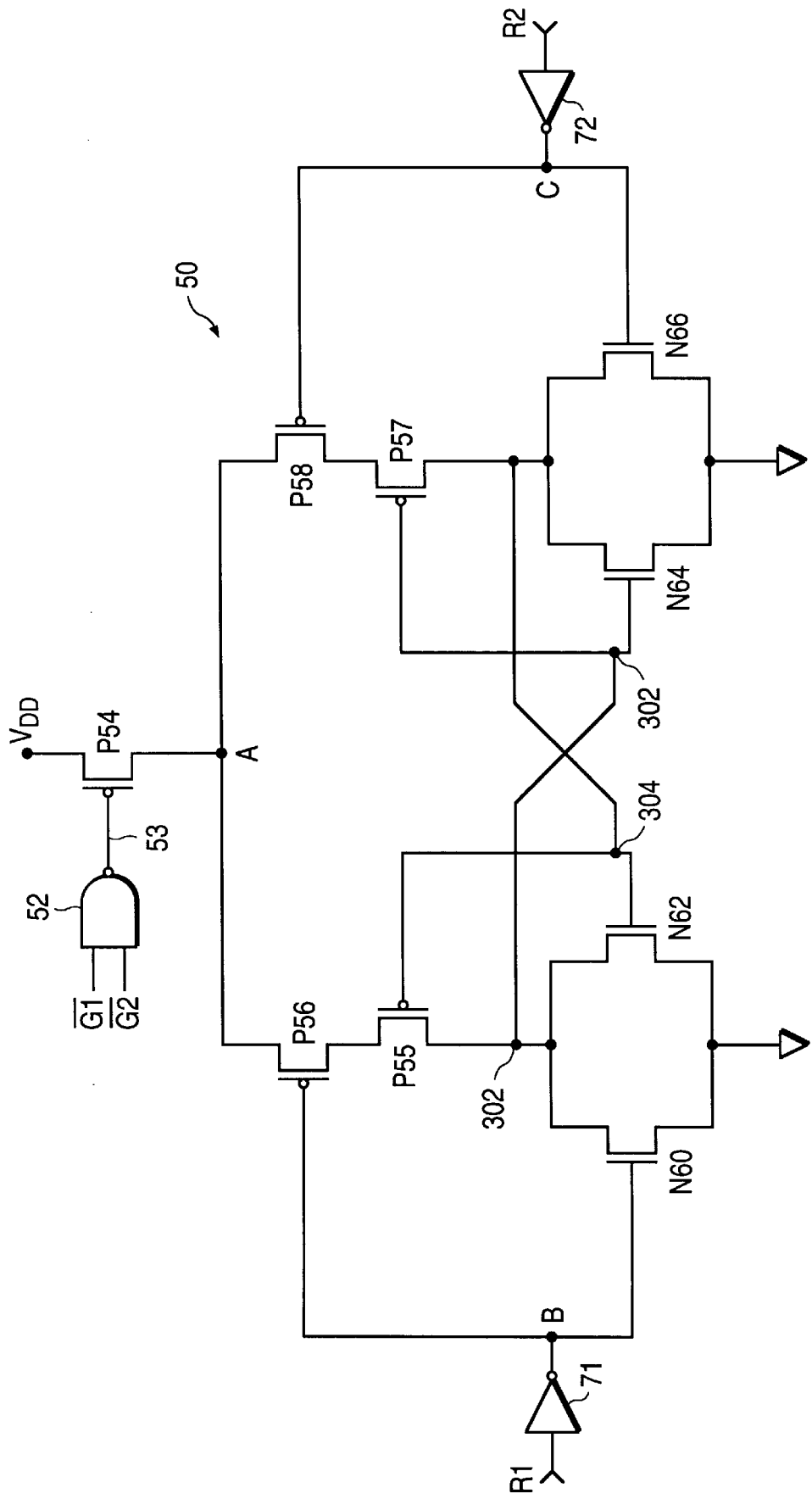
FIG. 3 illustrates a circuit diagram for use in an arbiter circuit of the present invention.

The arbiter circuit 200 of FIG. 2 can be constructed as shown with AND gates 602 through 616 and MUTEX elements $30_1$ through 304 known in the art. In an alternative embodiment of the present invention, the function of the MUTEX element and its associated pair of AND gates can be combined into one circuit. Referring to FIG. 3, a diagram of a combination AND gate pair 602 and 604/MUTEX element $30_1$ according to the present invention is shown. The circuit 50 includes NAND gate 52, P channel transistors P54, P55, P56, P57 and P58, N channel transistors N60, N62, N64 and N66, and inverters 70 and 72. (Note, node 302 and node 304 of the circuit 50 correspond to the output nodes 302 and 304 of MUTEX element $30_1$ respectively as shown in FIG. 2.)

NAND gate 52 is coupled to receive grant signal $\overline{G1}$ and grant signal $\overline{G2}$ and to generate an enable signal 53 in response thereto. The gate of transistor P54 is coupled to the enable signal 53, and the source and drain of transistor P54 is coupled between a power supply $V_{DD}$ and node A. The gate of transistor P55 is coupled to node 304. The gate of transistor P56 is coupled to node B. The source and drain of transistor P55 and transistor P56 are coupled in series between between node A and node 302. The gate of transistor P57 is coupled to node 302. The gate of transistor P58 is coupled to node C. The source and drain of transistor P57 and transistor P58 are coupled in series between between node A and node 304. The input of inverter 70 is coupled to receive request signal R1 and to provide its complement signal $\overline{R1}$ at node B. The gate of transistor N60 is coupled to node B. The gate of transistor N62 is coupled to node 304. The source and drains of transistor N60 and transistor N62 are coupled in parallel between node 302 and ground. The input of inverter 72 is coupled to receive the request signal R2 and to provide its complement signal $\overline{R2}$ at node C. The gate of transistor N66 is coupled to node C. The gate of transistor N64 is coupled to node 302. The source and drains of transistor N64 and transistor N66 are coupled in parallel between node 304 and ground.

Operation of the circuit 50 is best described using an example. Consider the state wherein the MUTEX element 301 is enabled. In this state, grant signals G1 and G2 are both low (G1=0, G2=0), their complement signals $\overline{G1}$ and $\overline{G2}$ are both high ($\overline{G1}$=1, $\overline{G2}$=1), and request signal R1 and request signal R2 are both low (R1=0 and R2=0). Under these conditions, the output of NAND gate 52 is low, activating the enable signal 53 and causing transistor P54 to turn on. As a result, node A is pulled up and power is provided to the remainder of circuit 50. Node B is high since signal R1 is low. As a consequence, transistor P56 is off, and transistor N60 is on, pulling node 302 down, causing transistor P57 on the other side of the circuit 50 to turn on. Similarly, node C is high because signal R2 is low. Transistor P58 is therefore off and transistor N66 is on pulling node 304 down, causing transistor P55 to turn on. The MUTEX element $30_1$ is therefore enabled and is waiting for the receipt of request signals R1, R2, or both before generating a grant signal.

If the first user requests access to the shared resource, then the request signal R1 transitions high and the potential at node B transitions low. In response, the transistor P56 turns on, and both transistor P55 and transistor P56 pull node 302 high. At the same time, transistor N60 turns off, removing the pull down effect on node 302. As a result, node 302 is pulled to a high logic level and is provided to the input of AND gate 118 as illustrated in FIG. 2. When the done signal $\overline{D}$ occurs, the grant signal G1 transitions high (G1=1) in the same manner as previously described. When G1 transitions, the enable signal 53 at output of NAND gate 52 transitions high, and the transistor P54 turns off, thereby disabling the circuit 50 by disconnecting it from the power supply $V_{DD}$.

Circuit 50 is also designed to keep node 302 high and node 304 low after the above-described arbitration decision has been made, but before the grant signal G1 has issued. When node 302 is high, transistor N64 turns on, holding node 304 low. Further, transistor P57 turns off, preventing node 304 from being pulled high in the event transistor P58 is turned on. As a result, the nodes 302 and 304 remain stable, and will not inadvertently switch if a request signal R2 is received by the circuit 50 after request signal R1, but before grant signal G1 has been issued.

Alternatively, if the second user requests access to the shared resource, then the request signal R2 transitions high and the potential at node C transitions low. In response, the transistor P58 turns on, and both transistor P57 and transistor P58 pull node 304 high. At the same time, transistor N66 turns off, removing the pull down effect on node 304. As a result, node 304 is pulled to a high logic level and is provided to the input of AND gate 120 as illustrated in FIG. 2. When the done signal $\overline{D}$ occurs, the grant signal G2 transitions high (G2=1) in the same manner as previously described. When G2 transitions, the enable signal 53 at output of NAND gate 52 transitions high, and the transistor P54 turns off, thereby disabling the circuit 50 by disconnecting it from power Supply $V_{DD}$ Circuit 50 is also designed to keep node 304 high and node 302 low after the above-described arbitration decision has been made, but before the grant signal G2 has been issued. When node 304 is high, transistor N62 turns on, holding node 302 low. Further, transistor P55 turns off, preventing Page: 16 node 302 from being pulled high in the event transistor P56 is turned on. As a result, the nodes 302 and 304 remain stable, and will not inadvertently switch if a request signal R1 is received by the circuit 50 after request signal R2, but before the grant signal G2 is issued.

If request signal R1 and request signal R2 both transition high at approximately the same time, then the circuit 50 attempts to pull node 302 and node 304 high at the same time. As node 302 is pulled high, however, it begins to turn on transistor N64, which creates a pull down effect on node 304, and begins to turn off transistor P57, diminishing the pull up effect on node 304. Concurrently, as node 304 is pulled high, transistor N62 begins to turn on pulling down node 302, and transistor P55 begins to turn off, diminishing the pull up effect on node 302. As a result, the circuit 50 enters a metastable condition. Eventually, one of the nodes is pulled up, and the other is pulled down. The pulled up node causes its corresponding grant signal to transition, while the request corresponding to the node that was pulled down remains ungranted.

The circuit 50 was described with respect to the first MUTEX element $30_1$. It should be noted, however, that the same circuit can be used for the other MUTEX elements $30_2$ through $30_4$ and their corresponding AND gates 606 through 616 respectively. The TABLE VII below specifies the request signals, grant signals, and output nodes for each MUTEX element $30_1$ through $30_4$ and their corresponding AND gates.

TABLE VII

| MUTEX ELEMENT | REQUEST SIGNALS | GRANT SIGNALS | OUTPUT NODES |
| --- | --- | --- | --- |
| $30_1$ | $\overline{R1}, \overline{R2}$ | $\overline{G1}, \overline{G2}$ | 302, 304 |
| $30_2$ | $\overline{R1}, R2$ | $G1, \overline{G2}$ | 306, 308 |
| $30_3$ | $R1, \overline{R2}$ | $\overline{G1}, G2$ | 310, 312 |
| $30_4$ | $R1, R2$ | $G1, G2$ | 314, 316 |

Figure 4:
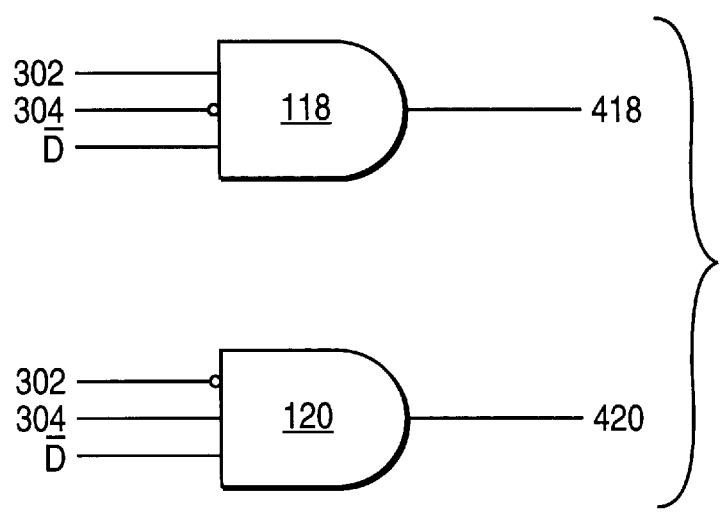
FIG. 4 illustrates a logic diagram of a circuit used in the arbiter circuit of the present invention.

Referring to FIG. 4, a logic diagram of two "special" AND gates for use in the arbiter circuit 200 according to one embodiment of the present invention is shown. The special AND gates, identified by reference numerals 118 and 120 in FIG. 4 correspond to the logic gates of the same reference numerals in FIG. 2 of the present application. The special AND gate 118 is coupled to receive the signal at node 302, the signal at the signal at node 304 and the done signal $\overline{D}$. The special AND gate 120 is coupled to receive the signal at node 304, the signal at node 302, and the done signal $\overline{D}$.

The special AND gates 118 and 120 each generate a high output signal only when: (1) the done signal has arrived (i.e., $\overline{D}$ transitions high); (2) the input without the bubble on it is at a sufficiently high logic level; and (3) the input with the bubble is at a sufficiently low logic level. For AND gate 118, this means that the input signal at node 302 must be sufficiently high and the input signal at node 304 must be sufficiently low to cause the output 418 of the gate to transition high with the receipt of the done signal $\overline{D}$. For AND gate 120, this means that the input signal at node 304 must be sufficiently high and input signal at node 302 must be sufficiently low to cause the output 420 of the gate to transition high with the receipt of the done signal $\overline{D}$.

The thresholds of AND gates 118 and 120 are chosen to avoid the possibility of asserting outputs 418 and 420 while circuit 50 is in a metastable condition. Alternative circuits may be used to avoid the possibility of asserting outputs 418 and 420 while circuit 50 is in a metastable condition. For example, a differential gate; idea is presented in the Mead and Conway reference cited above. Other well known alternatives may also be used. Similar special AND gates may be used for AND gates 122 through 132 of the arbiter 200.

It should be noted that the transistors P54, P55, P56, P57, P58, N60, N62, N64 and N66 should be properly sized relative to one another to assure correct operation of the circuit 50. Similarly, the transistors of the high-threshold AND gates also must be properly sized with respect to the circuit 50 to assure correct operation of the arbiter circuit 200. It also should be noted that according to various embodiments of the invention, the placement of transistors P55 and P56 and the placement of transistors P57 and P58 could be switched relative to one another. Such an arrangement may be desirable depending on the operating environment of the circuit 50.

The circuit 50 provides several advantages. The grant signal G1 and grant signal G2 select and enable the one MUTEX element among the four MUTEX elements. The request signals are directly applied to the selected MUTEX element, and the arbitration process begins as soon as the request signals arrive. Lastly, if the circuitry shown in FIG. 3 and FIG. 4 is used, the number of gates along the input/output path of the arbiter 200 is reduced, and as a result, the speed of the circuit is increased.

While the present invention has been described in relationship to the embodiments described in the accompanying specification, other alternatives, embodiments and modifications will be apparent to one skilled in the art. It is intended that the specification be only exemplary, and that the true scope and spirit of the invention be indicated by the following claims.

What is claimed is:

1. An arbiter circuit configured to issue one grant signal among a set of grant signals in response to one or more request signals from a set of users seeking access to a shared resource, the arbiter circuit comprising:

a plurality of arbiter elements, each one of the plurality of arbiter elements coupled to receive one or more request signals; and a select circuit configured to select one arbiter element among the plurality of arbiter elements to arbitrate the next request signal or signals received by the arbiter circuit, the select circuit being configured to select the one arbiter element based on the state of the set of grant signals which are fedback from the output of the arbiter circuit to the select circuit.

2. The arbiter circuit of claim 1, further comprising an enable circuit configured to enable the one arbiter element selected by the select circuit.

3. The arbiter circuit of claim 2, wherein the enable circuit is further configured to provide power to the one arbiter element to enable the one arbiter element selected by the select circuit.

4. The arbiter circuit of claim 2, wherein the enable circuit includes a logic gate.

5. The arbiter circuit of claim 1, wherein the select circuit is configured to select only one of the plurality of arbiter elements at a time.

6. The arbiter circuit of claim 1, wherein each of the plurality of arbiter elements is configured to receive a different combination of the request signals and grant signals.

7. The arbiter circuit of claim 6, wherein each of the plurality of arbiter elements is configured to receive a first request signal from a first user and a second request signal from a second user.

8. The arbiter circuit of claim 7, wherein a subset of the plurality of arbiter elements is configured to receive a complement of the first request signal and a complement of the second request signal.

9. The arbiter circuit of claim 6, wherein each of the plurality of the arbiter elements is configured to receive a combination of a first grant signal and a second grant signal.

10. The arbiter circuit of claim 9, wherein the first grant signal and the second grant signal combination which is configured to be received by each of the plurality of arbiter elements is different.

11. The arbiter circuit of claim 6, wherein the different combination configured to be received by each of the plurality of arbiter elements includes different combinations of signals selected from the group including a first grant signal, a complement of the first grant signal, a second grant signal, a complement of the second grant signal, a first request signal from a first user, a complement of the first request signal, a second request signal from a second user, and a complement of the second request signal.

12. The arbiter circuit of claim 12, wherein the select ciruit comprises an AND gate coupled to receive a first request signal, a first grant signal, and a second grant signal.

13. The arbiter circuit of claim 12, wherein the select ciruit further comprises a second AND gate for receiving a second request signal, the first grant signal, and the second grant signal.

14. The arbiter circuit of claim 13, wherein the first AND gate, the second AND gate, and the one arbiter element are combined in an integrated circuit.

15. The arbiter circuit of claim 14, wherein the integrated circuit comprises a logic gate coupled to receive the first grant signal and the second grant signal and is further configured to generate an enable signal to selectively enable the one arbiter element in response thereto.

16. The arbiter circuit of claim 14, wherein the integrated circuit further comprises:
  a first input node coupled to the first AND gate for receiving the first request signal from a first user seeking access to the shared resource;
  a first output node for switching to a first logic level in response to the first request signal received at the first input node; and
  a second output node for switching to a second logic level in response to the first request signal received at the first input node.

17. The arbiter circuit of claim 16, wherein the integrated circuit further comprises a special threshold gate coupled to the first output node.

18. The arbiter circuit of claim 1, wherein the one arbiter selected by the select circuit causes a first grant signal to transition among the set of grant signals when issuing access to the shared resource to a first user among the set of users.

19. A method of operating an arbiter circuit which issues one grant signal among a set of grant signals in response to one or more request signals from a set of users seeking access to a shared resource, the method comprising the steps of:
  receiving one or more request signals at a plurality of arbiter elements; and
  selecting one arbiter element among the plurality of arbiter elements to arbitrate the next request signal or signals received by the plurality of arbiter elements based on the state of the set of grant signals which are fedback from the output of the arbiter circuit to the select circuit.

20. A method of providing an arbiter circuit which issues one grant signal among a set of grant signals in response to one or more request signals received from a set of users seeking access to a shared resource, the method comprising the steps of:
  providing a plurality of arbiter elements, each one of the plurality of arbiter elements coupled to receive one or more request signals; and
  providing a select circuit, coupled to the plurality of arbiter elements, for selecting one arbiter element among the plurality of arbiter elements to arbitrate the next request signal or signals received by the arbiter circuit, the provided select circuit selecting the one arbiter element based on the state of the set of grant signals which are fedback from the output of the arbiter circuit to the select circuit.

* * * * *